(12) United States Patent
Okhotnikov et al.

(10) Patent No.: US 7,940,817 B2
(45) Date of Patent: May 10, 2011

(54) METHOD FOR ORGANIZING A MODE-LOCKED PULSE TRAIN BY PUMP MODULATION

(75) Inventors: Oleg Okhotnikov, Tampere (FI); Mircea Guina, Tampere (FI)

(73) Assignee: Reflekron Oy, Tampere (FI)

( * ) Notice: Subject to any disclaimer, the term of this patent is extended or adjusted under 35 U.S.C. 154(b) by 504 days.

(21) Appl. No.: 10/507,579

(22) PCT Filed: Mar. 7, 2003

(86) PCT No.: PCT/FI03/00173
§ 371 (c)(1),
(2), (4) Date: Mar. 28, 2005

(87) PCT Pub. No.: WO03/077420
PCT Pub. Date: Sep. 18, 2003

(65) Prior Publication Data
US 2005/0163170 A1   Jul. 28, 2005

(30) Foreign Application Priority Data

Mar. 13, 2002   (FI) .................................... 20020467

(51) Int. Cl.
*H01S 3/098* (2006.01)
*H01S 3/067* (2006.01)
(52) U.S. Cl. ................... 372/18; 372/6; 372/30
(58) Field of Classification Search .................. 372/18, 372/6, 30
See application file for complete search history.

(56) References Cited

U.S. PATENT DOCUMENTS

| 5,008,887 | A | | 4/1991 | Kafka et al. |
| 5,050,183 | A | | 9/1991 | Duling, III |
| 5,237,577 | A | | 8/1993 | Keller et al. |
| 5,414,725 | A | | 5/1995 | Fermann et al. |
| 5,627,854 | A | | 5/1997 | Knox |
| 5,701,319 | A | | 12/1997 | Fermann |
| 5,987,049 | A | | 11/1999 | Weingarten et al. |
| 6,064,682 | A | * | 5/2000 | Vickers ........................ 372/38.04 |
| 6,097,741 | A | * | 8/2000 | Lin et al. ............................ 372/6 |
| 2002/0048078 | A1 | | 4/2002 | Schiller |

FOREIGN PATENT DOCUMENTS

WO   WO 01/05004 A1   1/2001

OTHER PUBLICATIONS

J. Kerdiles "Modulation of Saturable Absorber Q-switched Laser by a Train of Picosecond Pulses" Opto-Electronics 1 (1969) 193-195.*
Gray, S. et al., "Soliton fiber laser with a hybrid saturable absorber", Optics Letters, Feb. 1, 1996, vol. 21, No. 3, pp. 207-209.

(Continued)

*Primary Examiner* — Minsun Harvey
*Assistant Examiner* — Marcia A. Golub-Miller
(74) *Attorney, Agent, or Firm* — Venable LLP; Eric J. Franklin

(57) ABSTRACT

A method to stabilize the repetition rate in a passive harmonic mode-locked fiber laser employing semiconductor saturable absorbers. The pulse organization is accomplished by electrically modulating the amplifier pump source that in turn optically modulates the saturable loss of semiconductor absorber. Due to an efficient modulation mechanism of the cavity loss, the method can be used to generate an actively mode-lock pulse train.

10 Claims, 15 Drawing Sheets

OTHER PUBLICATIONS

Zhang, Z. et al., "Gold-reflector-based semiconductor saturable absorber mirror for femtosecond mode-locked $Cr^{4+}$:YAG lasers", Appl. Phys. B 70 [Suppl.], (2000), pp. S59-S62.

Nakazawa, M. et al., "TDM single channel 640 Gbit/s transmission experiment over 60 km using 400fs pulse train and walk-off free, dispersion flattened nonlinear optical loop mirror", Electronics Letters, Apr. 30, 1998, vol. 34, No. 9, pp. 907-908.

Boivin, L. et al., "Transmission over 362 km of 110 Channels at 2.35 Gb/s from a Spectrum-Sliced Femtosecond Laser", IEEE Photonics Technology Letters, vol. 11, No. 10, Oct. 1999, pp. 1319-1321.

Collings, Brandon C. et al., "Short Cavity Erbium/Ytterbium Fiber Lasers Mode-Locked with a Saturable Bragg Reflector", IEEE Journal of Selected Topics in Quantum Electronics, vol. 3, No. 4, Aug. 1997, pp. 1065-1075.

Grudinin, A. B. et al., "Passive harmonic modelocking of a fibre soliton ring laser", Electronics Letters, Oct. 14, 1993, vol. 29, No. 21, pp. 1860-1861.

Harvey, G. T. et al., "Harmonically mode-locked fiber ring laser with an internal Fabry-Perot stabilizer for soliton transmission", Optics Letters, Jan. 15, 1993, vol. 18, No. 2, pp. 107-109.

Carruthers, Thomas F. et al., "10-GHz, 1.3-ps erbium fiber laser employing soliton pulse shortening", Optics Letters, Dec. 1, 1996, vol. 21, No. 23, pp. 1927-1929.

Okhotnikov, O.G. et al., "Stabilization of Passive Harmonic Mode-Locking by Amplitude Modulation", IEEE Photonics Technology Letters, vol. 14, No. 2, Feb. 2002, pp. 146-148.

Thoen, E.R. et al., "Stabilization of an active harmonically mode-locked fiber laser using two-photon absorption", Optics Letters, vol. 25, No. 13, Jul. 1, 2000, pp. 948-950.

Okhotnikov, O.G. et al., "Colliding-pulse harmonically mode-locked fiber laser", Appl Phys. B 72, pp. 381-384 (2001).

* cited by examiner

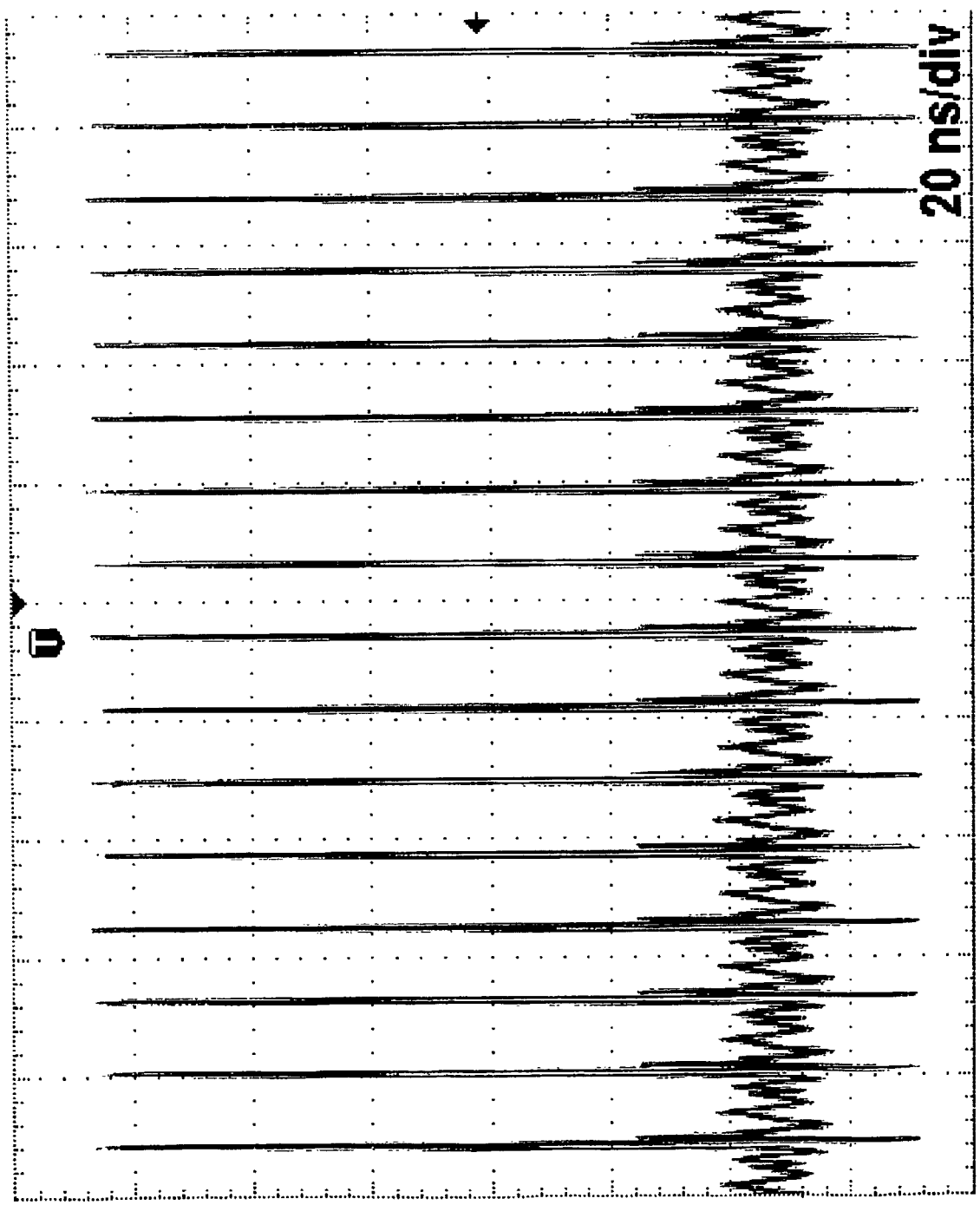

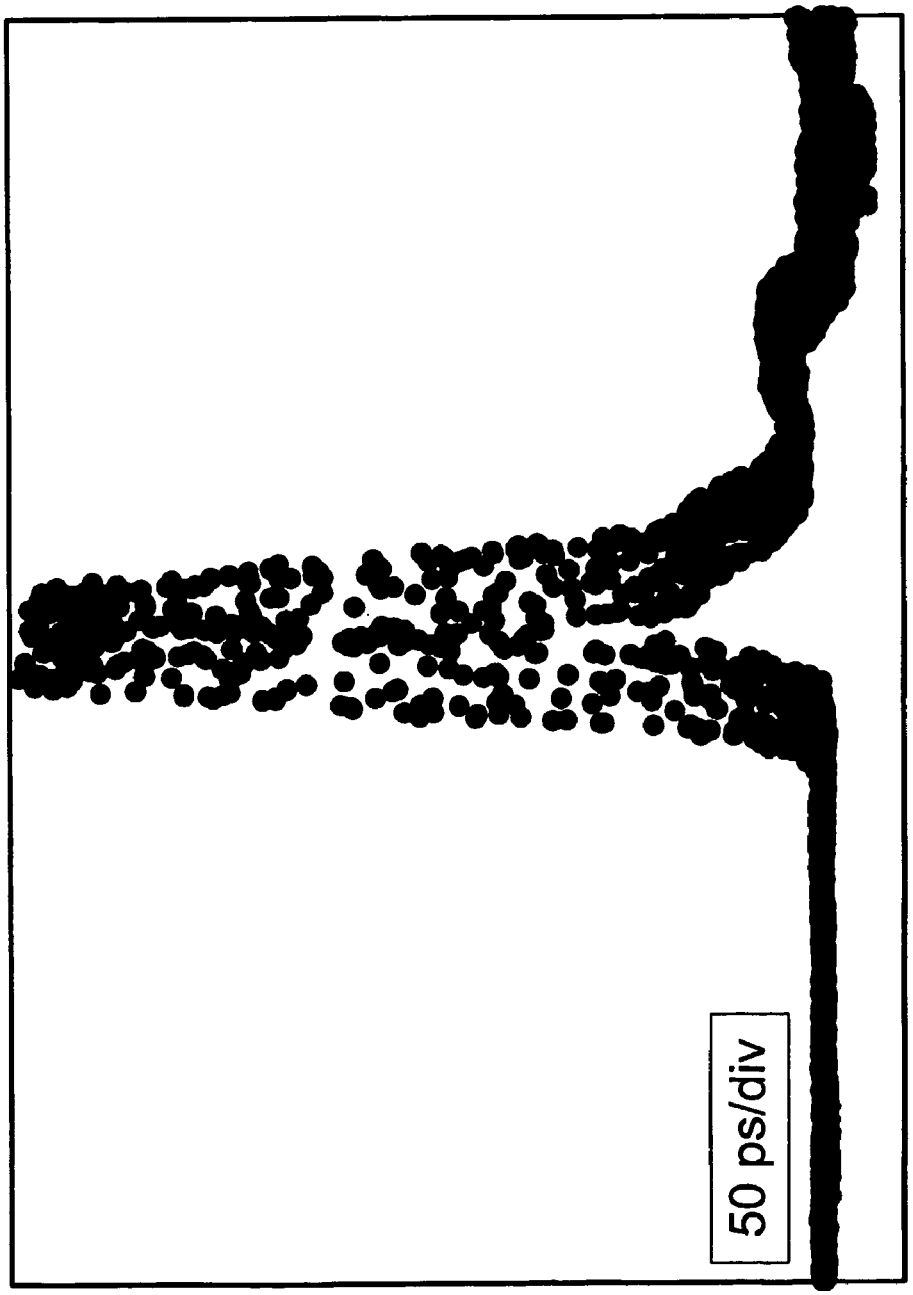

METHOD FOR ORGANIZING A MODE-LOCKED PULSE TRAIN BY PUMP MODULATION

FIELD OF THE INVENTION

The present invention relates generally to mode-locked fiber lasers, and in particular, to stabilization or locking to an electrical signal of a passive harmonic mode-locked pulse train. The fiber laser comprises means for generating a mode-locked pulse train, means for stabilizing said mode-locked pulse train to an electrical signal, a semiconductor absorber, and a pump for optically modulating a saturable loss of a semiconductor absorber to produce said mode-locked pulse train. The invention also relates to a method for stabilizing a mode-locked pulse train to an electrical signal, in which a saturable loss of a semiconductor absorber is optically modulated by a pump to produce said mode-locked pulse train. The invention further relates to a system for stabilizing a mode-locked pulse train to an electrical signal, comprising a pump for optically modulating a saturable loss of a semiconductor absorber to produce said mode-locked pulse train.

BACKGROUND OF THE INVENTION

Compact sources generating ultrashort optical pulses near 1550 nm wavelength range are widely regarded as a key enabling technology in developing future optical networks. Several transmission schemes, such as described by Nakazawa et al. in Electron. Lett., vol. 34, pp. 907-909, 1998 and Boivin et al. in Photon. Technol. Lett., vol. 11, pp. 1319-1321, 1999, have been proposed to increase the system capacity by efficiently using ultrashort pulse generators. Mode-locked fiber lasers, employing rare-earth doped fiber as the lasing material and exploiting various active and passive mode-locking techniques provide an attractive source of ultra-short pulses with tunable repetition rate and tunable laser wavelength. See for example U.S. Pat. No. 5,008,887 to Kafka and U.S. Pat. No. 5,050,183 to Duling.

Passive mode-locking techniques based on saturable absorber are the most promising as it concerns the pulsewidth and the simplicity of the laser cavity, as described by Collings et al. in J. Sel. Top. in Quantum Electron., vol. 3, pp. 1065-1075, 1997 and U.S. Pat. No. 6,097,741 to Lin et al. A saturable absorber imposes an intensity dependent nonlinear effect on a light beam incident upon it. An incident radiation of low intensity is absorbed while a high intensity radiation is permitted to pass the absorber with much less attenuation. Thus, when used in a laser cavity the saturable absorber will introduce intensity dependent losses. Because the laser tends to operate with minimum cavity loss per round-trip the longitudinal modes of the lasers are locked together in phase corresponding to high intensity short optical pulses in the time domain. A mode-locking technique which relies upon the use of the nonlinear reflectivity of a semiconductor saturable absorber mirror (SESAM) is attractive because it eliminates the need for critical cavity alignment, it can be designed to operate in a wide spectral range, has ultrafast nonlinear dynamics and relatively large nonlinear reflectivity changes. Ultrashort optical pulses have been produced with this technique using different semiconductor structures and mirror designs. See for example U.S. Pat. No. 5,627,854 to Knox, U.S. Pat. No. 5,237,577 to Keller and Zhang et al., Appl. Phys. B, vol. 70, pp. 59.62, 2000.

In order to achieve gigahertz repetition rate a mode-locked laser has to be operated at a harmonic of the fundamental frequency. It should be noted, however, that due to the long relaxation time of the amplifier, the laser will only saturate in the average power and not individual pulses, as thought by Harvey et al. in Opt. Lett., vol. 18, pp. 107-109, 1993. Therefore the output of such a laser suffers increased pulse-to-pulse instability and supermode competition, thus leading to pulse dropouts and repetition rate instability. Harmonic mode-locking stabilization, a primary condition for telecommunication applications, has been achieved using both active and passive techniques.

Actively mode-locked lasers produce pulses with excellent stability, however pulses are typically much longer than those obtained by passive mode-locked lasers. To further reduce the pulse width, actively mode-locked fiber lasers synchronized to an external clock have been demonstrated employing soliton pulse shortening, as demonstrated by Kafka et al. in Opt. Lett. vol. 14, pp. 1269, 1989 and Carruthers et al. in Opt. Lett., vol. 21, pp. 1927-1929, 1996, or other passive pulse shaping techniques, see Okhotnikov et al., Photon. Tech. Lett., vol. 14, 2002. Further details for producing short duration pulses are disclosed in the technical paper of D. J. Jones et. al, Opt. Lett., vol. 21, pp. 1818, 1996. Moreover, it was shown that in a harmonically active mode-locked fiber ring laser (Thoen et al., Opt. Lett., vol. 25, 948-950, 2000), the amplitude fluctuations can be significantly reduced, thus pulse dropouts are eliminated, owing on optical limiting action of two-photon absorption in semiconductor saturable absorbers. However, an actively mode-locked fiber laser requires advanced modulation devices and driving electronics, resulting in complicated and ultimately expensive laser cavities.

In contrast, Fermann et al., see U.S. Pat. No. 5,414,725 and Okhotnikov et al., see Appl. Phys. B, vol. 72, pp. 381-384, 2001 demonstrated a passive technique to produce ultrashort pulses with stable repetition rates comparable to that of typical mode-locked lasers. The stabilization of the repetition rate was achieved by harmonic partitioning of the laser cavity by a semiconductor saturable absorber which is preferentially bleached when the two pulse streams circulating within the main cavity of length n×L, respective subcavity of length L collide upon the saturable absorber. While this system proved very efficient in stabilizing the repetition rate it has the limitation of a fixed repetition rate with selection of the positioning of the saturable absorber and is only adjustable by physically moving the intra-cavity elements defining the main cavity, respective the 'harmonic' sub-cavity.

In another attempt, generation of ultrashort pulses with stable and adjustable repetition rate from passively mode locked fiber lasers was achieved by using a semiconductor saturable absorber with a life-time of the order of 10 ns into a fiber lasers with cavity round-trips of the order of 100 ns, as further disclosed in U.S. Pat. No. 5,701,319. However the pulse jitter was limited to 300 ps and 50 ps for a repetition rate of 20 MHz, respectively 500 MHz. Yet it is believed that such a laser generates a harmonic pulse train with a reduced long-term stability of the repetition rate.

Grudinin et al. suggested, in Electron. Lett., vol. 29, pp. 1860-1861, 1993, that soliton interplay, through long-lived acousto-optic interactions, can stabilize the repetition rate of a passive harmonic mode-locked pulse train. However, this method requires large intracavity powers to achieve sufficient nonlinearities for stable operation. Thus, cavity lengths of 15 m and longer are required resulting in low fundamental repetition rates which in turns leads to environmental instability and calls for pump levels of a few hundred milliwatts in order to achieve repetition rates of hundred MHz. Yet, more recently, Gray et al. postulated that phase effects in semiconductor saturable absorber could lead to pulse repulsion, which provides in turn self-stabilization of the pulse repetition rate, see Opt. Lett., vol. 21, pp. 207-209, 1996. However, pulse self-organization provided by saturable absorber is sensitive to absorber lifetime and uniform pulse distribution was not observed for absorbers with a carrier lifetime of less than 500 ps. Moreover the repulsive forces between pulses, responsible for self-organization, are sensitive to amplitude fluctuations, therefore optical limiting has to take place in order to build up a stable pulse train.

Recently, generation of an equally spaced soliton pulse train from a short-cavity harmonic mode-locked fiber laser employing a passive pulse formation mechanism, i.e. semiconductor saturable absorber, has been achieved by modulating the cavity loss through optical pumping the saturable absorber by a control beam, as described by Banadeo et al. in Opt. Lett., vol. 25, pp. 1421-1423, 2000. The modulation beam, with a wavelength above semiconductor absorber bandgap, was generated by externally modulating a semiconductor laser placed outward the fiber laser cavity. It was shown that the time ordering could be dramatically improved by this method given that the modulation beam has a frequency of a high harmonic of the fundamental repetition rate. The method resulted in 35-dB suppression of the undesired harmonic modes of a 1.244 GHz-pulse train. Thus, it was demonstrated that optical modulation of the saturable absorber has the potential to generate a jitter-free pulse train with controlled repetition rates and reduced complexity. Roth et al. further developed the method by using a directly modulated high-speed laser diode and implementing a simpler design for internally pumping the saturable absorber, see Electron. Lett., vol. 38, pp. 16-17, 2002.

Although the above-described method provides the means to reduce the complexity of the laser cavity, the use of an additional semiconductor laser as pumping sources for providing optical modulation of the saturable absorber, sets a limit in the attempt of achieving cost effective laser designs.

SUMMARY OF THE INVENTION

It is an object of the present invention to provide a stable low cost harmonic passive mode-locked fiber laser capable of generating ultrashort optical pulses with controlled repetition rate. The present invention seeks a more efficient way of controlling the repetition rate of passively mode-locked fiber laser by modulating the light beam used both for pumping the laser amplifier and optically modulating the saturable absorber loss. Yet it is another aim of the present invention to provide an efficient mechanism to actively mode-lock a fiber laser by optically controlling the loss introduced by a semiconductor saturable absorber.

A method according to the present invention is primarily characterized by that said pump is modulated by an electrical signal. A system according to the present invention is primarily characterized by that the system comprises means for modulating said pump by an electrical signal. A fiber laser according to the present invention is primarily characterized by that the fiber laser comprises means for modulating said pump by an electrical signal.

As already stated herein and elsewhere, see B. C. Collings et al., Opt. Lett., vol. 23, pp. 123-125, 1998, a short cavity mode-locked fiber laser has the advantage of generating ultrashort pulses at very high fundamental repetition rates. This in turn leads to harmonic mode-locking operation with a low number of pulses circulating in the cavity that have increased stability against noise and environmental fluctuations. On the other hand a short fiber amplifier will not completely absorb the available pump power required to provide a certain gain value. Even for an optimized amplifier there is a significant fraction of the incident pump, for example 10%, that is not absorbed. As a result the residual pump power is eventually lost through the cavity end, i.e. the one containing the saturable absorber. To increase the pump absorption efficiency the saturable absorber mirror can be optimized to reflect both the pump beam and the signal light. Yet another way to increase the pump absorption efficiency is to propagate the pump light in a direction away from the saturable absorber, thus being reflected back by a broadband mirror positioned at the cavity end opposing the saturable absorber. However, the pump energy is not completely absorbed even after double passing the amplifier section. According to the present invention, the pump beam, and in consequence the residual pump energy, incident upon a semiconductor saturable absorber positioned at the amplifier end to passively mode-lock a fiber laser, is intensity modulated by a RF signal with a frequency substantially equal with the repetition rate of the mode-locked pulse train. By modulating the cavity loss introduced by the absorber the mode-locked pulse train can be synchronized to an external electrical signal, therefore achieving repetition rate stabilization, without the need for external components, i.e. modulators. It should be noted that the population relaxation time for an rare-earth doped active material ranges from hundreds of microseconds to few milliseconds, therefore any pump variation on a much smaller time scale, for example, microsecond to nanoseconds, will not induce a gain variation. More precisely, the gain will rather have a constant value set by the average level of the pump signal.

The application of the present invention depends on an efficient high-speed modulation response of standard high-power pump lasers modules. Recently, Mohrdiek et al., demonstrated direct intensity modulation at 3 Gb/s of a 980 nm high-power pump-diode module, (LEOS'98 IEEE, pp. 299-300, 1998). Moreover, the intrinsic modulation bandwidth measurements showed excellent modulation capabilities extended beyond the frequency of 10 GHz. Therefore we believe that this invention can be successfully accomplished offering a great improvement over today state of the art ultrashort pulse fiber lasers, in particular due to reduced complexity and minimal cost.

BRIEF DESCRIPTION OF THE DRAWINGS

A complete understanding of the invention is provided by the description of the specific illustrative embodiments and the corresponding drawings in which:

FIGS. 10a, 10b and 10c present the digital scope traces, the measured RF spectra and the fast communication analyzer traces of the laser output, having the optical modulation enabled.

DETAILED DESCRIPTION OF THE INVENTION

Figure 1:
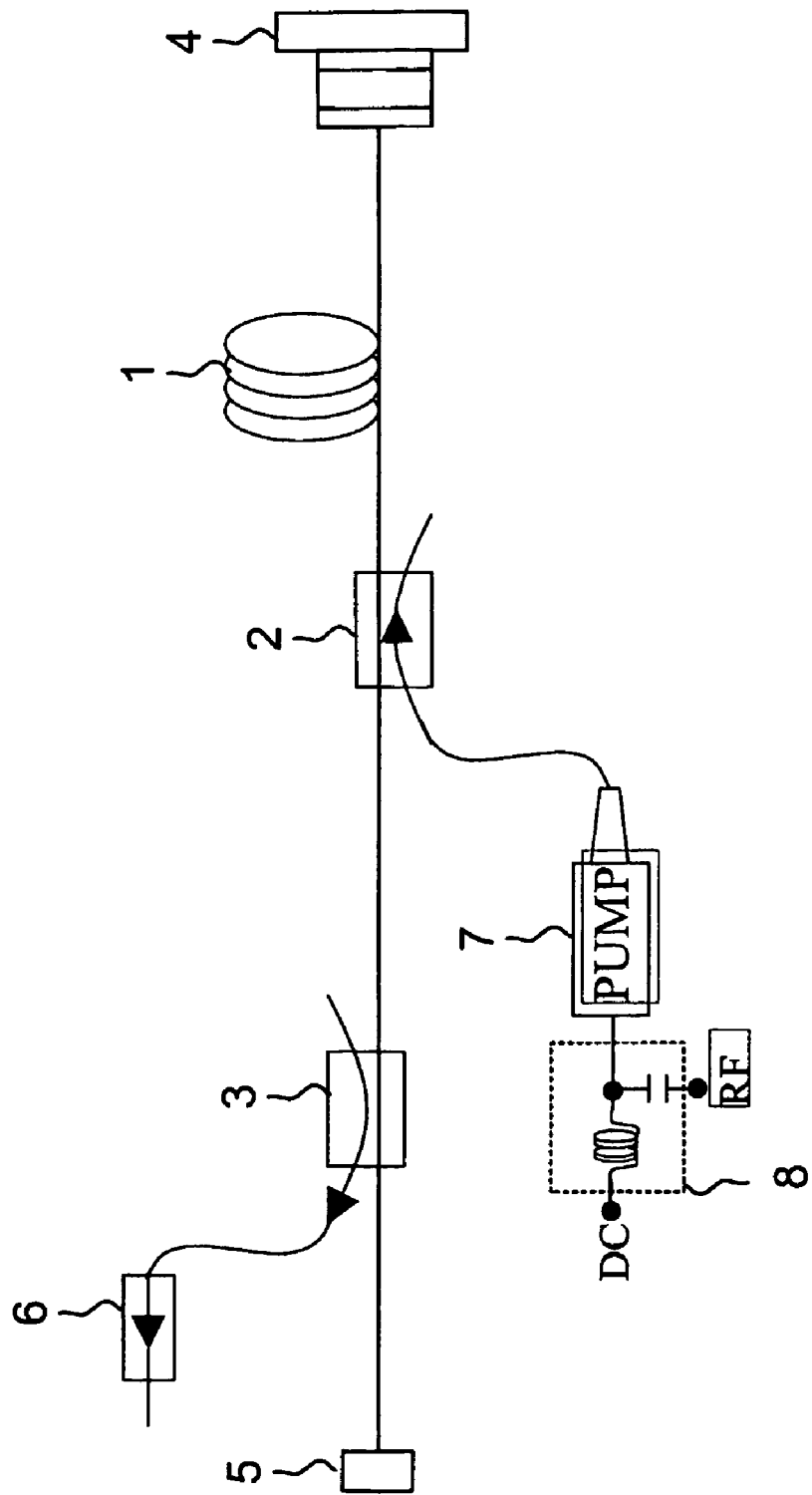
FIG. 1 shows a preferred embodiment of the present invention.

A preferred embodiment of the present invention is presented in FIG. 1. The laser cavity consists of a gain medium 1, e.g. erbium doped fiber, a fiber optical coupler 2, i.e. WDM, for coupling a pump beam to the gain fiber and an optical coupler 3 for extracting the laser pulses out of the resonator. The cavity ends of the fiber laser are butt-coupled to a saturable absorber 4 and a broadband dielectric mirror 5. The optical isolator 6 reduces the optical reflections from the output port. A pigtailed semiconductor laser diode 7 is used for pumping the gain medium, e.g. Er-doped fiber. Although the main embodiments of the present invention are discussed here in respect to the erbium-doped amplifier, other gain media (e.g. ytterbium, thulium, neodymium, praseodymium) can be used, exhibiting different concentration of the doping atoms, different geometrical parameters, e.g. double-clad fiber, and alternative pumping schemes.

The saturable absorber 4 consist in general of a semiconductor material with a band-gap energy in the vicinity of laser wavelength that is integrated with a semiconductor mirror designed to provide a certain reflectivity for the laser radiation. The semiconductor absorber can be, for example, InGaAsP material with a band-gap of 1550 nm. The semiconductor mirror comprises, for example, a certain number of InP—InGaAs layers designed to offer a high reflectivity over a large spectral range extending around the laser wavelength. Alternatively the saturable absorber can be used in transmission, in this case the semiconductor mirror is not required. Without going into details, it is noted that various absorber designs, including but not limited to multiple-quantum-well absorbers, bulk absorbers, organic dyes, excitonic based absorbers, saturable-Bragg-reflectors, anti-resonant Fabry-Perot saturable absorbers mirrors, dispersive saturable absorber mirrors, wafer-bonded absorbers, metallic mirror based absorbers, can be used without departing from the scope of the present invention.

According to the present invention the light beam emitted by the pump diode 7, with a wavelength above the energy band gap of the absorber, is used both for exciting the rare-earth atoms, thus resulting in stimulated emission of light at around 1550 nm, and to optically pump the semiconductor absorber 4. The pump diode is directly modulated by an electrical signal consisting of a continuous component (DC) and a modulation signal (RF), having for example a sinusoidal or rectangular shape, with a frequency equal with the repetition rate of the harmonic mode-locking pulse train. A bias-T 8 combines the DC and RF signals used for modulation the pump source. Driving the pump diode only by the DC component causes the fiber laser to operate in a passive harmonic mode-locking regime induced by the saturable absorber. Applying a modulation signal with a frequency equal with one of the cavity harmonics will modulate the loss introduced by the saturable absorber thus locking the positions of the harmonic mode-locked pulses train to the time window when the modulation is applied. The levels of the applied DC and RF signals should be optimized according to two design rules. First, the available pump power increases with the DC signal for a given amplitude of the RF signal. On the other hand, if the pump power incident on the absorber has a high DC component, it will continuously saturate the absorber therefore reducing the modulation index of the absorber, the driving force responsible for self-starting and stabilizing the mode locked pulse train. At limit the pump laser can be driven only by the RF signal with the DC component in the threshold vicinity therefore maximizing the modulation index of the absorber in expense of decreasing the pump energy for a given modulation amplitude of the drive signal. Since the amplifier dynamics cannot follow the pump variation, the gain will be determined by the average optical power of the pump beam that in turn depends on the modulation amplitude and the duty cycle. Moreover, the saturation features of the absorber, i.e. optical modulation index, can be optimized by coating the absorber surface to ensure an efficient mode-locking and stabilization mechanisms for a given pump power and pump modulation amplitude. Alternatively by optimizing the saturable absorber and the laser cavity the method can be used for generation a pure actively mode-locked pulse train.

Figure 2:
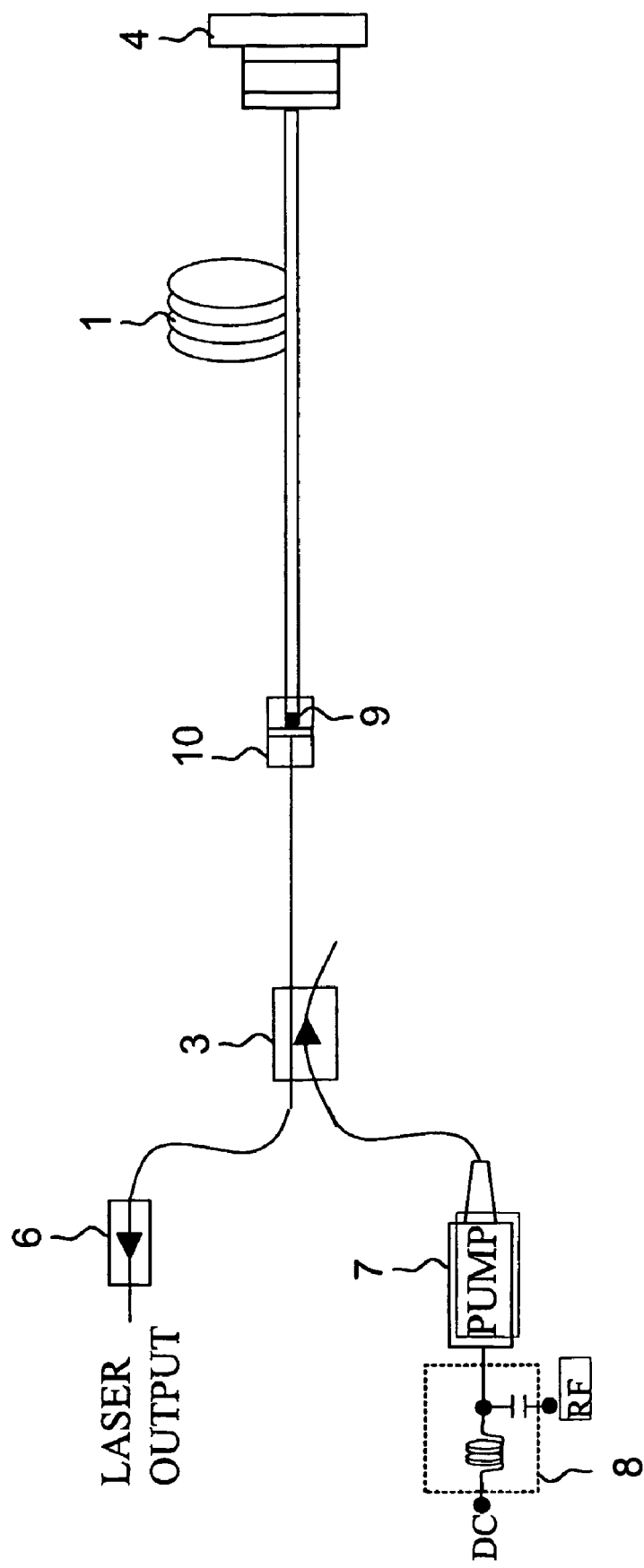
FIG. 2 is a description of a short-cavity laser set-up in accordance with the present invention.

In attempt to further reduce the laser complexity another embodiment of the present invention is described in the FIG. 2. Here the Er-doped fiber end opposing the saturable absorber 4 is coated with a dichroic mirror 9 having a high reflectivity at the signal wavlength and a high transmissivity at the pump wavelength. The pigtailed pump 7 is coupled to the Er-doped fiber through the coated end via a WDM coupler 2 and a rotary splice 10 or a glued splice. The same port is used to couple the signal light out of the laser cavity. The above described laser system offers several important improvements over the previous design such as: increased repetition rate for the same amplifier length by eliminating the intra-cavity output coupler, increased laser efficiency by using only one output port, and reduced price.

Figure 3:
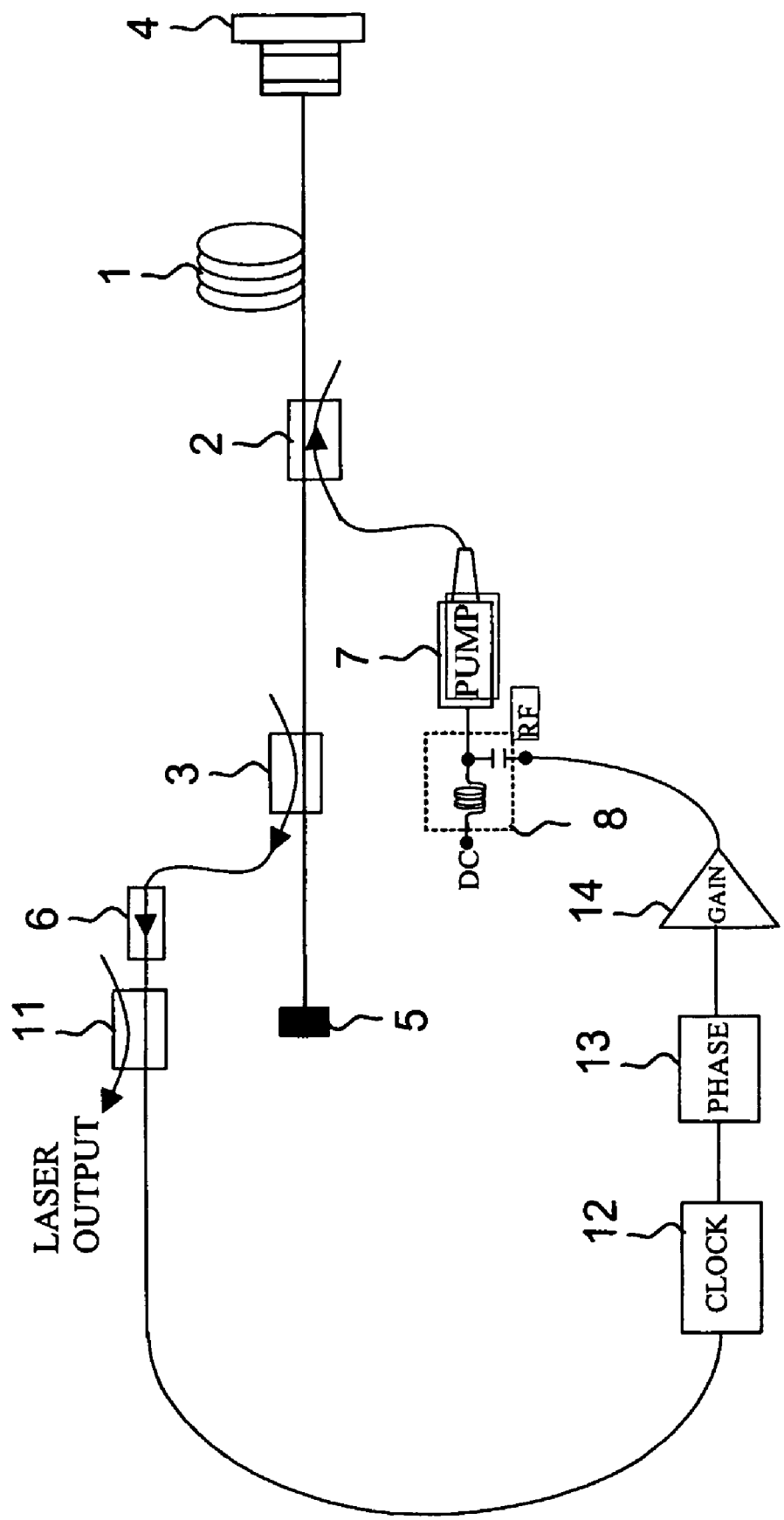
FIG. 3 depicts another embodiment of the invention employing regenerative-feedback for setting the repetition rate.

It is well know that temperature and environmental fluctuation leads to changes of the fundamental repetition rate of mode-locked fiber laser. Therefore, an active technique for organizing the pulse train requires fine-tuning of modulation frequency in order to eliminate the undesirable phase shift between the modulation and the mode-locked pulse train. Employing a regenerative mode-locking technique that extracts a clock signal from the output of the laser and use it to drive the modulator has already been proposed in order to solve this problem, see for example U.S. Pat. No. 5,598,425 to Jain et al. and Margalit et al., in Photon. Technol. Lett, vol. 10, pp. 337-339, 1998. An embodiment of a regenerative mode-locking technique implemented in accordance with the present invention is described in FIG. 3. The optical coupler 11 splits the laser output so that a part of the laser power feeds a clock extraction circuit 12 that, for example, includes a high-speed photo-detector, a narrow-band electrical filter and an electrical pre-amplifier (not shown). The clock extraction circuit generates a sinusoidal clock signal with a frequency corresponding to a high harmonic frequency of the laser cavity. The clock signal under-goes phase adjustment through the phase shifter 13, is amplified by an electrical amplifier 14 and is used to modulate the pump source 7. In this way intensity modulation of the light is carried out in the cavity at a frequency locked to the clock signal. Although the above mentioned laser design leads to a stable optical pulse train with a high repetition rate, the repetition rate slightly varies owing to fluctuation in the cavity length. This problem can further be solved by employing a technique to stabilize the cavity length as described in several publications, see for example Nakazawa et al., Photon. Technol. Lett., vol. 12, pp. 1613-1615, 2000.

Figure 4:
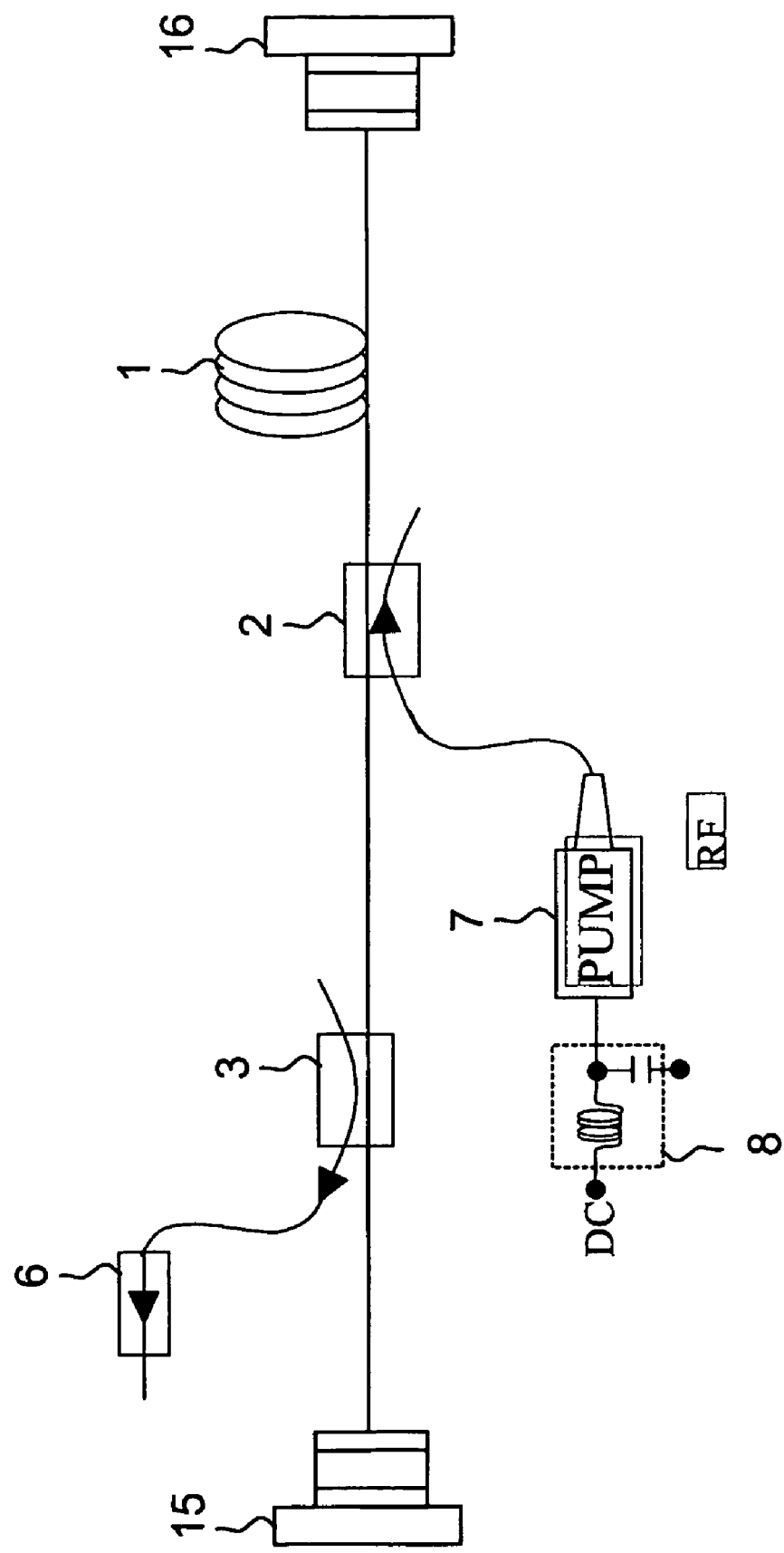
FIG. 4 illustrates an embodiment of a passive harmonic mode-locked fiber laser having a saturable absorber optically pumped above band-gap by a modulated pump beam. Another saturable absorber is used for passively starting the mode-locking process.

The selection of a particular saturable absorber in accordance with the present invention should address in general two design requirements: the saturable absorber 4 has to provide an efficient passive mechanism to mode-lock the laser and to have a high modulation index when it is optically modulated by the residual pump beam. In FIG. 4 an alternative embodiment of the invention is proposed aiming to easy the design constrains of the saturable absorber by using two saturable absorbers independently optimized to provide an efficient mode-locking mechanism, absorber 15, respectively a sufficient modulation index by optical pumping, absorber 16.

Figure 5:
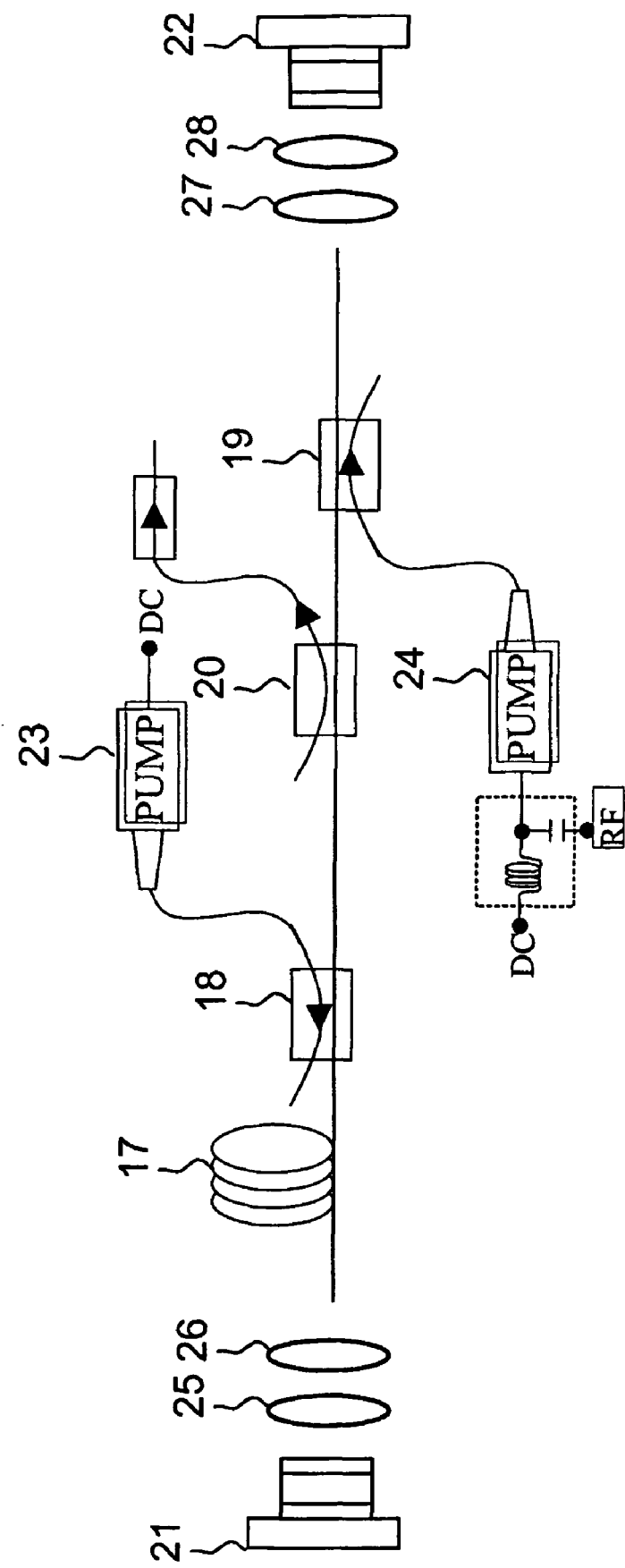
FIG. 5 describes an exemplary embodiment of the present invention.

Several experiments were conducted to prove the main idea behind this invention by verifying that a saturable absorber of a certain kind, optically pumped by a light beam with properties identical with the light used to pump the laser amplifier, can stabilize passive harmonic mode-locking. An exemplary embodiment of the present invention is shown in FIG. 5. Here the passive harmonic mode-locked fiber laser consist of a gain medium 17, i.e. erbium doped fiber, a fiber optical coupler 18, i.e. WDM, for coupling a pump beam to the gain fiber, another fiber optic coupler 19 for coupling to the cavity a controlled beam with a wavelength identical with the pump beam, an optical coupler 20 for extracting the laser pulses out of the resonator, a saturable absorbers 21 designed for efficiently starting the mode-locking process and yet another saturable absorbers 22 that is optically pumped by a control beam. The laser is pumped with a single-mode pig-tailed laser diode 23. A similar laser diode 24 is directly modulated by an electrical signal generating a control beam used to pump the saturable absorber 22.

In the performed experiment the erbium-doped fiber with a length of 1 m had an unpumped loss of 38 dB/m at 1535 nm, a core diameter of 6.2 µm, a numerical aperture NA=0.23 and normal group velocity dispersion (GVD) of +0.01 $ps^2$/m at 1560 nm. Referring to FIG. 5, it can be seen that the cavity includes means for focusing the laser beam onto the two saturable absorbers, i.e. lenses 25-28. It is important that the focal points of the lenses 25 and 28 coincide with the positioning of the saturable absorbers 21, 22 thus the absorber is efficiently saturated. The spot size on the saturable absorber 21, 22 can be changed, thus adjusting the saturation fluence of the absorber, by varying the lens position and by using lenses with different focal lengths. The fiber end was angle-cleaved to eliminate the influence of the Fresnel reflection.

For the exemplary study the saturable absorbers 21, 22 comprise several InGaAsP quantum-wells, latticed matched to InP, grown on top of a high reflective semiconductor mirror. The mirror consists of a periodic stack of alternating material layers of GaInAs—InP, i.e. Distributed Bragg Reflector (DBR). A similar structure was presented by Ning et al. in Electron. Lett., vol. 37, pp. 375-376, 2001.

Figure 6:
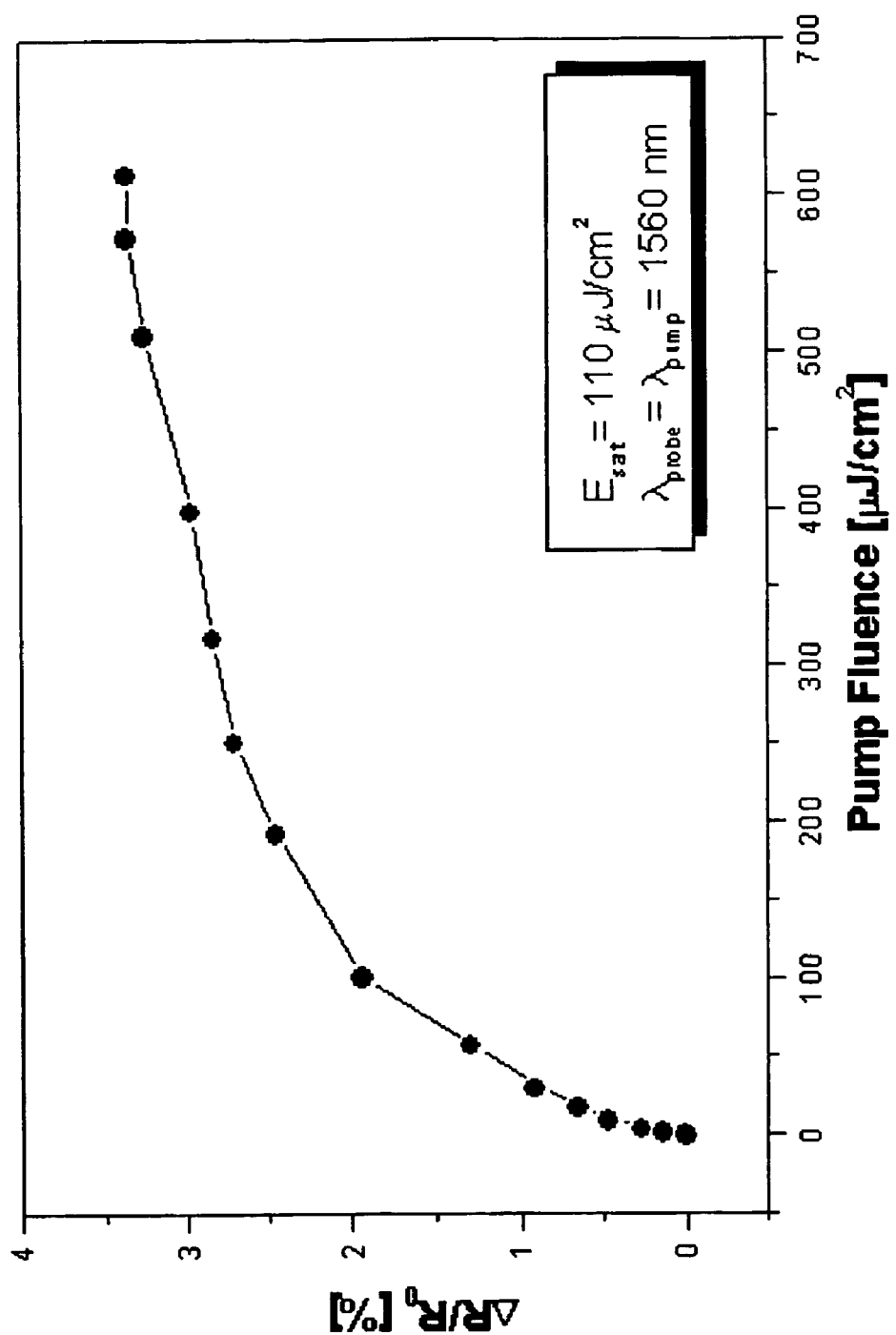
FIG. 6 shows the saturation curves for the semiconductor saturable absorber responsible for starting the mode-locking.
Figure 7:
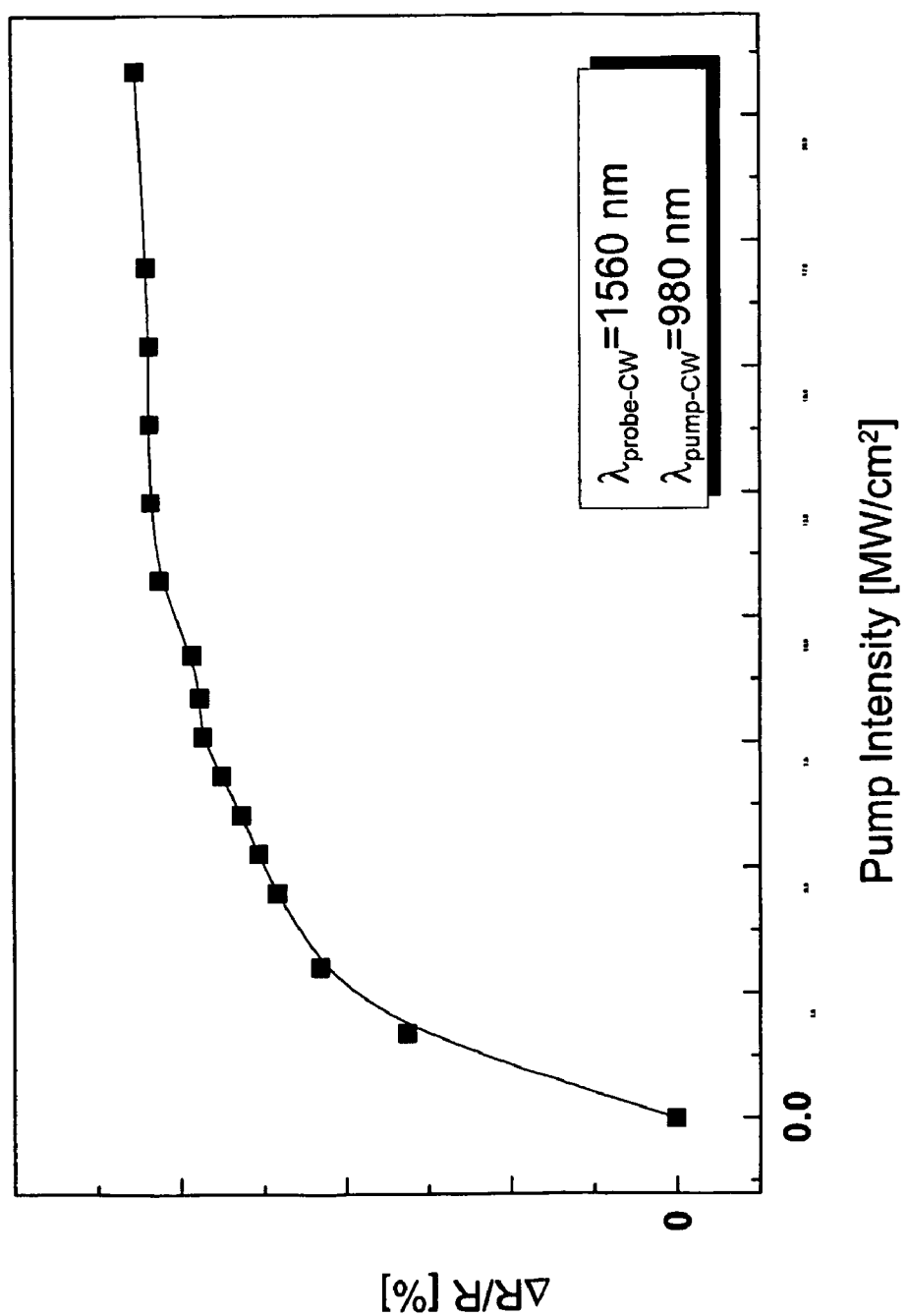
FIG. 7 reveals the nonlinear reflectivity change of the optical pumped absorber versus 980 nm pump intensity.

The two saturable absorbers were independently designed to optimize the passive mode-locking and to stabilize the repetition rate. The saturable absorber 21 is responsible for efficiently starting the mode-locking process while introducing minimal nonsaturable loss. FIG. 6 shows the nonlinear reflectivity change of this absorber measured as a function of the incident pulse fluence at the wavelength of 1560 nm. This device comprises, for example, seven quantum-wells and has a maximum reflectivity change of up to 3% while the non-saturable losses are limited to less than 10%, including the DBR loss. On the other hand the saturable absorber 22 should provide a high enough reflectivity change (modulation index) by optical pumping with a 980 nm modulated beam. Therefore this absorber consists of six groups of seven InGaAsP quantum-wells, resembling the same material design as the mode-locking absorber. As a result, shown in FIG. 7, an increase of the reflectivity change by a factor of about 4 was obtained.

Figure 8A:
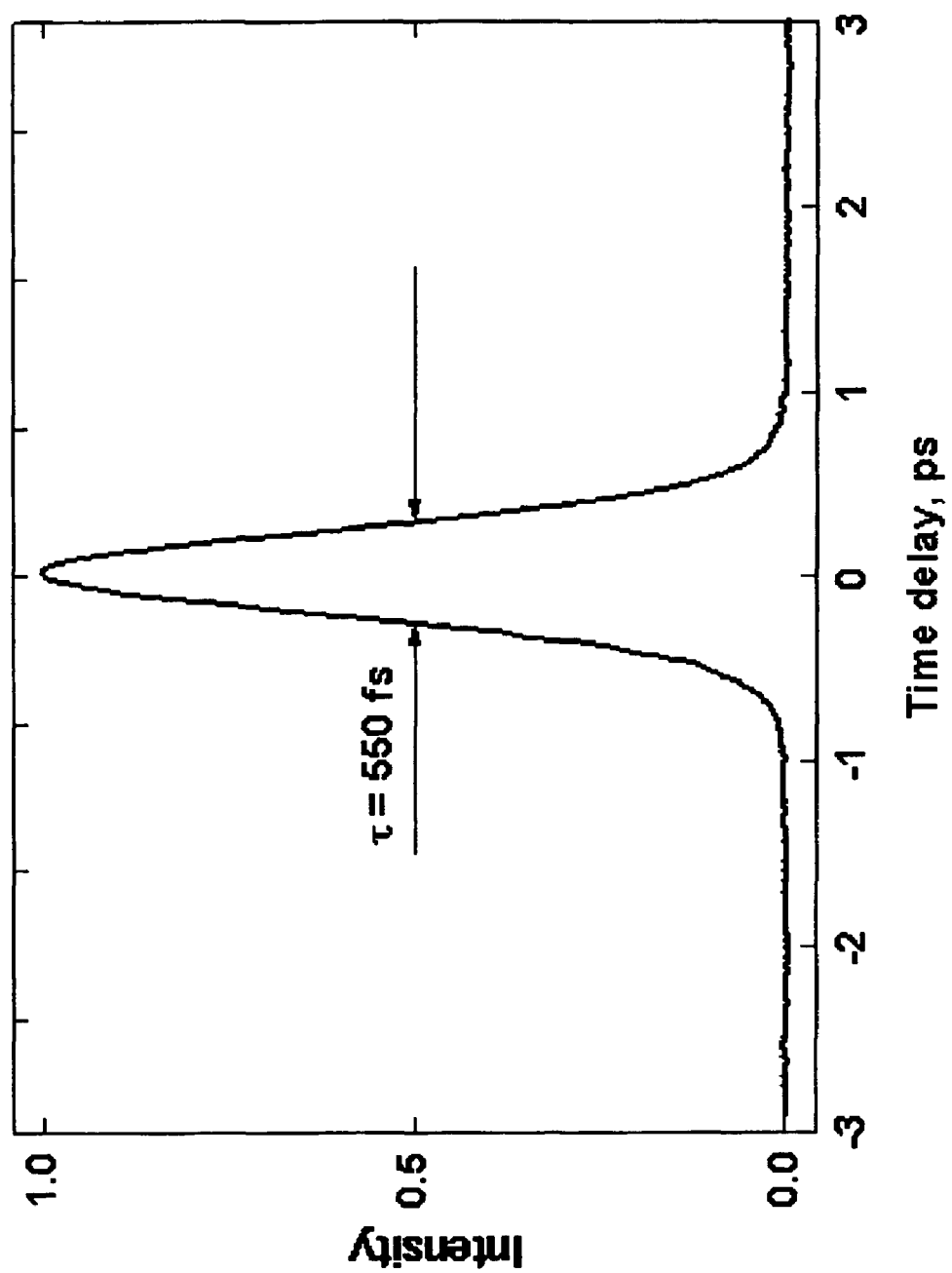
FIGS. 8a and 8b represent typical autocorrelation trace and optical spectrum of the exemplary laser output.
Figure 8B:
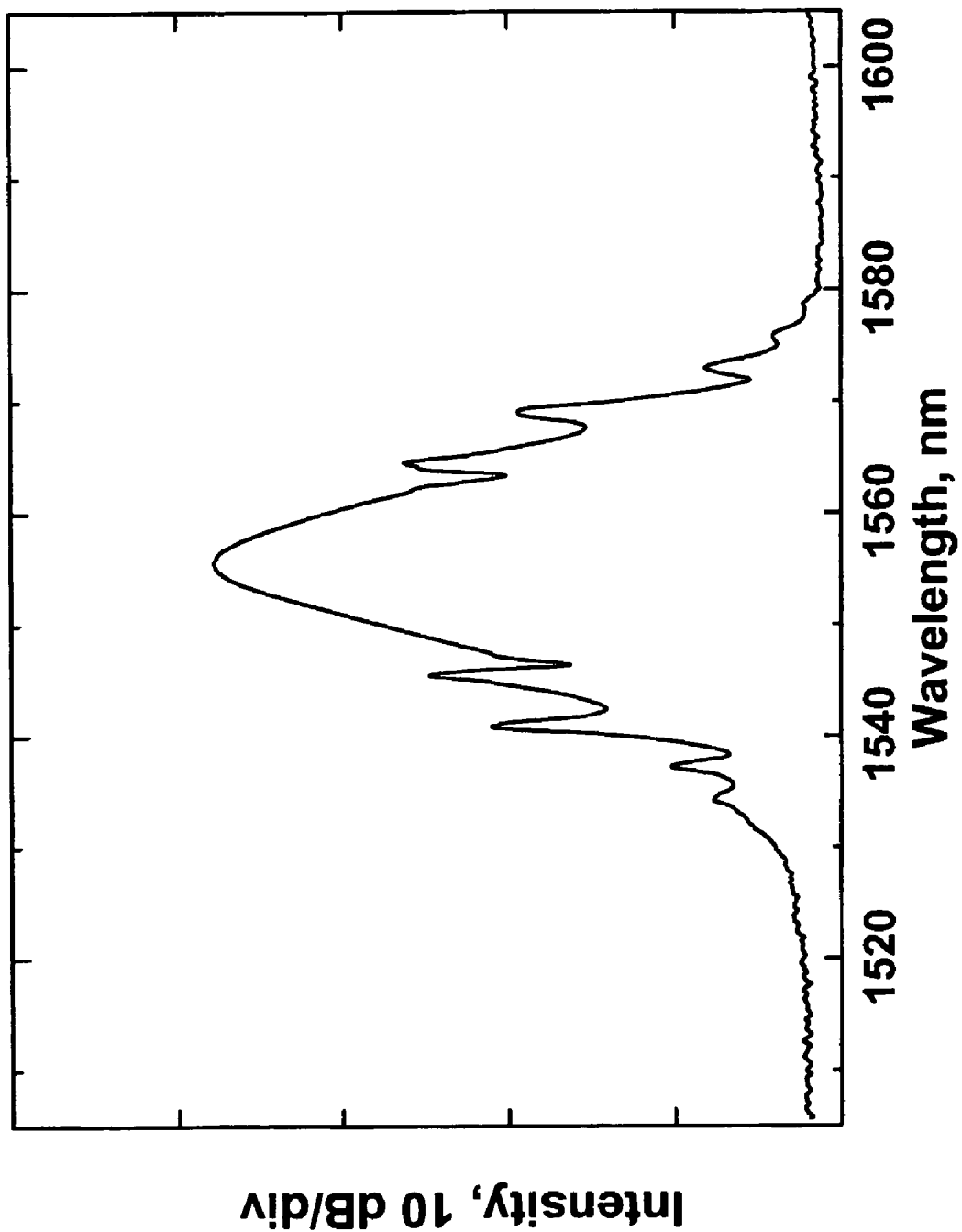
Figure 9A:
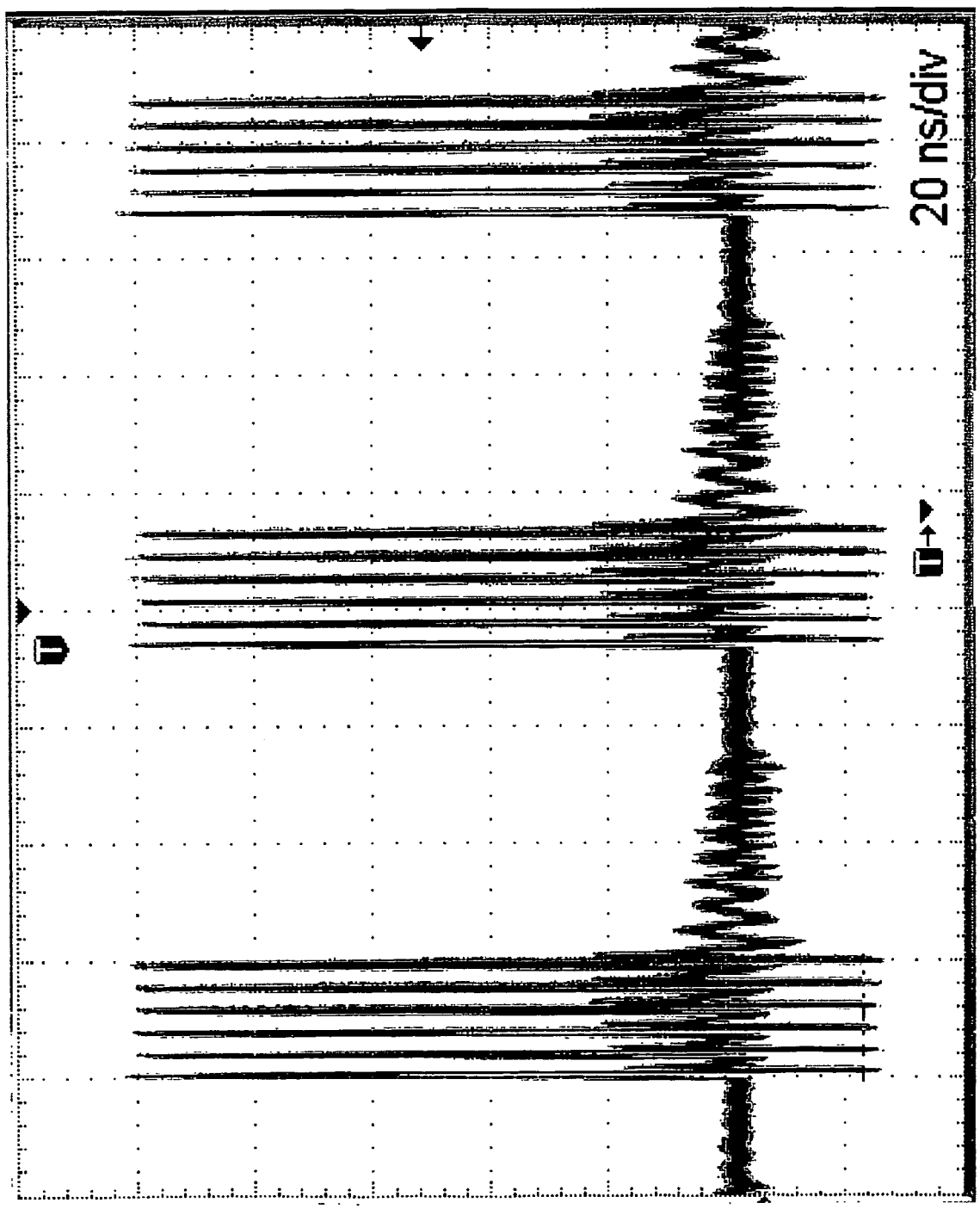
FIGS. 9a, 9b and 9c shows the digital scope traces, the measured RF spectra and the fast communication analyzer traces of the laser output, without repetition rate stabilization provided by optically pumping the saturable absorber.
Figure 9B:
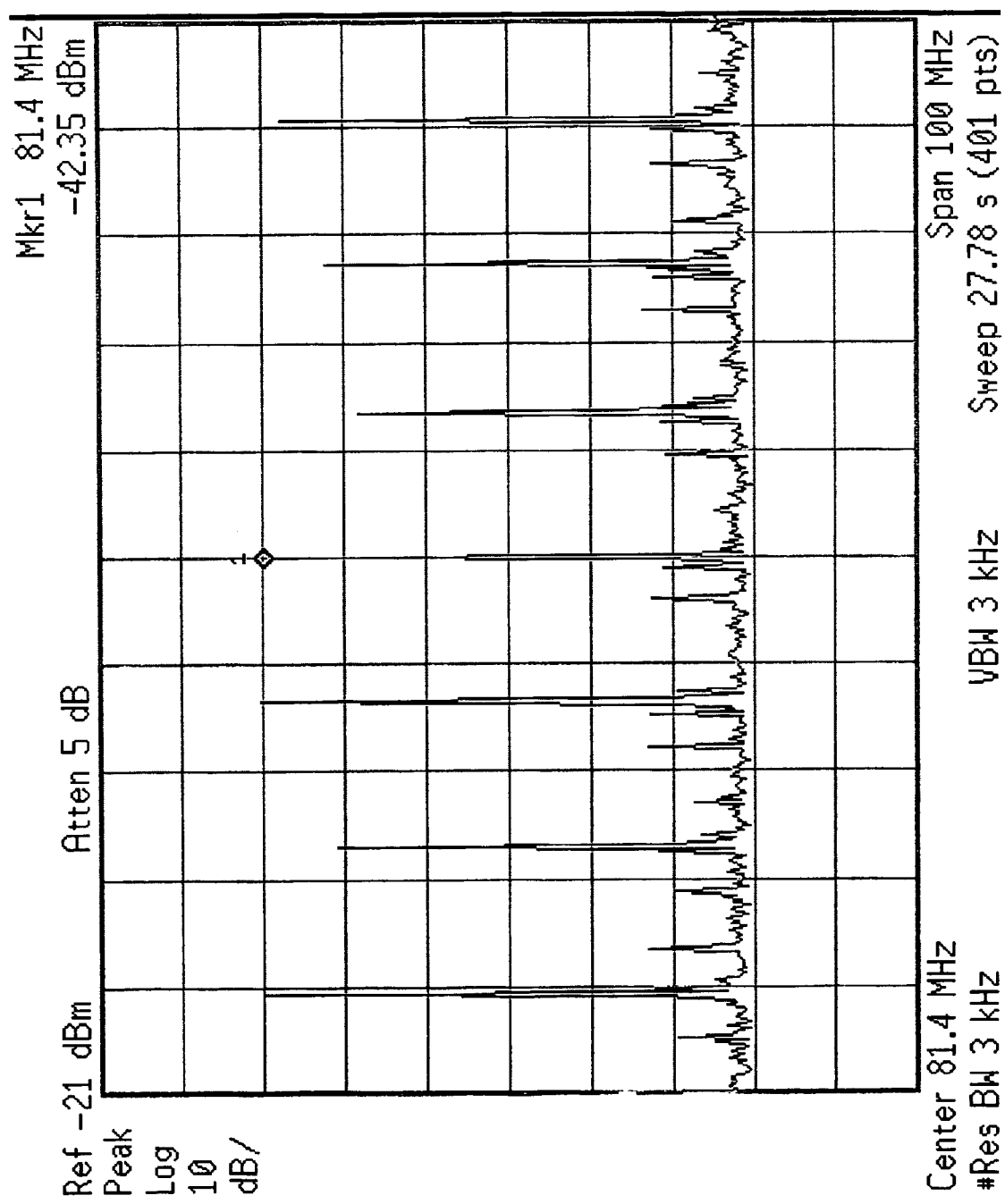
Figure 9C:
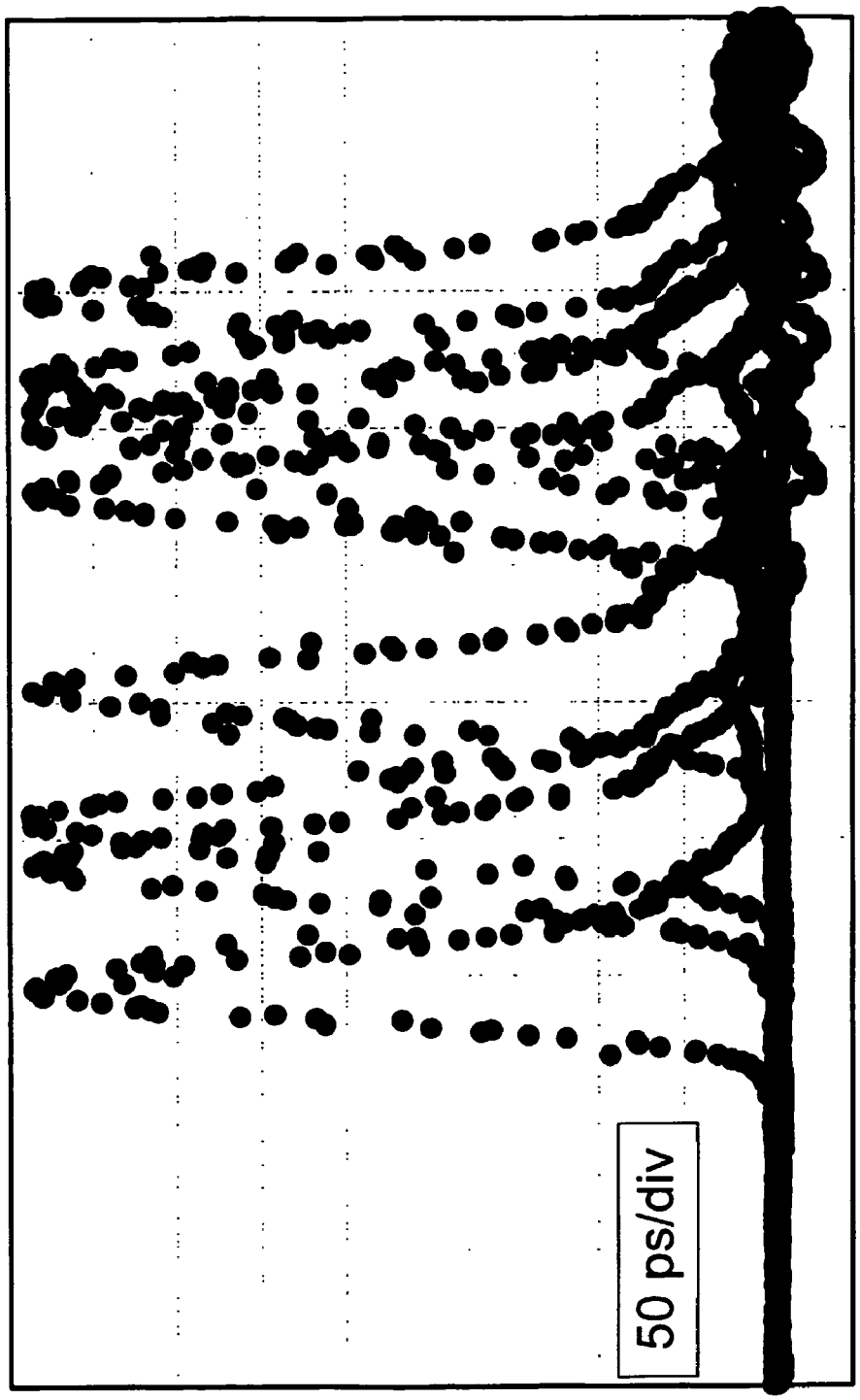

Initially, the laser was optimized for passive mode-locking with modulation signal provided by the pump source 24 off. Optimal alignment resulted in self-starting mode-locking provided by the saturable absorber 21. Increasing the pump power the laser operates with multiple pulses in the cavity. The multiple pulsing behaviour depends on the cavity loss and the nonlinear loss experienced by the saturable absorber. The laser produces soliton-shaped like pulses having a pulsewidth of about 550 ps independent on pump power. The autocorrelation trace and the optical spectrum of the mode-locked pulses are presented in FIG. 8a, respectively FIG. 8b. The laser occasionally exhibited pulse self-organization, however, the pulses were not firmly tied to periodic locations but rather were bunching together, see FIG. 9a. Here for clarity of the presentation the pump power level is set to produce harmonic mode-locked pulses running in the 6th harmonic (81.4 MHz) of the fundamental repetition rate. FIG. 9b reveals the RF spectrum of the pulse train consisting of six optical pulses circulating in the cavity. Without optically pumping the saturable absorber 22 the suppression of the cavity fundamentals was almost inexistent. Furthermore, the pulse spacing can vary by more than 250 ps from pulse to pulse as the measurements performed with a high-speed communication analyzer show in FIG. 9c. Thus it is concluded that the passive harmonic mode-locking can not generate a laser pulse train with a stable repetition rate.

Figure 10B:
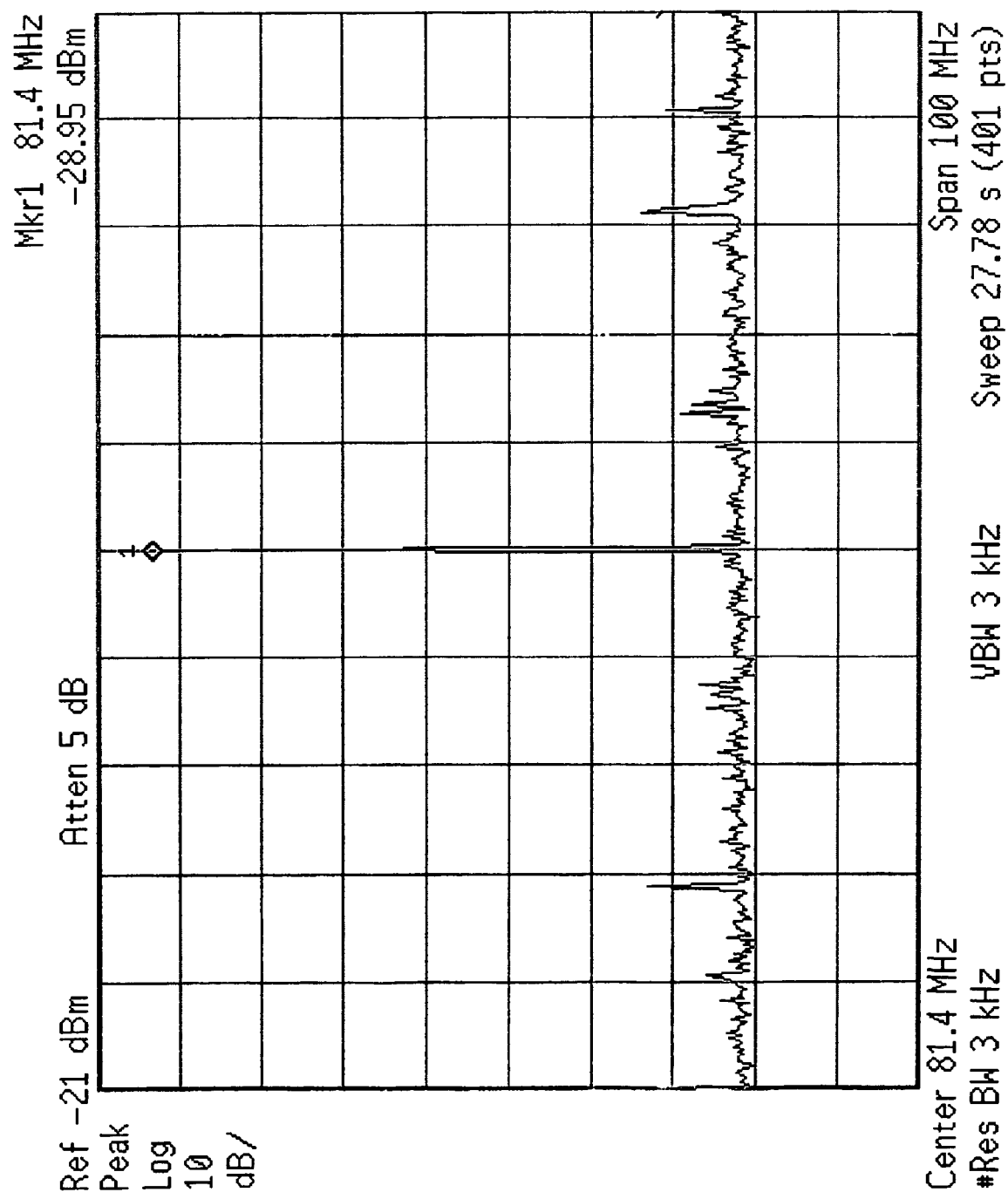

Then with the laser diode 24 optimally modulated by a RF signal at the sixth harmonic of the fundamental frequency, a strong pulse ordering can be observed clearly in the time domain. The positions of the pulses is determined by the low-loss time window defined by the optically pumped saturable absorber. FIG. 10a shows that the pulses were organized in stable pulse streams with regular intervals between pulses corresponding to harmonic modulation frequency. Indeed the measured RF spectrum presented in FIG. 10b demonstrates a suppression of lower cavity harmonics at least about 55 dB, which indicates uniform harmonic mode locking with highly periodic pulse train. Since the suppression of the unwanted harmonics in RF spectrum deteriorates to 37 dB with one pulse dropout per round trip, as thought by Bonadeo in Opt. Lett., vol. 25, pp. 1421-1423, 2000, this laser is free of pulse dropouts and has a highly stable supermode. During the optimization of the modulation parameters, no changes in pulse shape were observed. Furthermore, the improvement of the timing jitter with optical modulation on is presented in FIG. 10c. The peak-to-peak jitter was <30 ps, which represents a near 10 dB improvement over the purely passive harmonic mode-locked pulse train. The plot also indicates that there are almost no pulse-to-pulse energy fluctuations. Since no active cavity length control circuit was implemented, it is believed that the jitter is most probably dominated by environmental fluctuations of the cavity length. The non-polarization-maintaining design of the laser cavity also contributes to the degradation of the long-term stability. As the modulation frequency increases, the ability of the modulation to stabilize a harmonic mode-locked pulse train should increase, since time window corresponding to the maximum level of the modulation signal gets shorter. Thus, it is believed that higher modulation frequencies will further reduce the timing jitter. After the modulation is turned on, it takes a certain time for the pulses to be synchronized to the external clock signal. Indeed increasing the modulation factor for the control beam results in shorter stabilization time.

The above described laser configuration allows for independent optimization of the modulation conditions and the amplifier gain in expense of using two distinct pump sources and saturable absorbers for mode-locking and optical modulation.

Yet another variation of the present invention consists of replacing the 980 nm pump source, with a source generating light at the wavelength close to 1480 nm. In this case the heating effects due to optical absorption of 980 nm light by InP material is avoided in the expense of a relatively higher price of 1480 nm pump sources.

The system of the present invention allows for various modifications of the design, i.e. ring laser cavity, "Sigma" laser, all PM-fiber laser, cavity feed-back, as well as other configurations common in the art, without departing from the spirit and scope of the invention. It is intended that the full measure of the invention be determined with reference to the following claims.

The invention claimed is:

1. A method for stabilizing a mode-locked pulse train to an electrical signal, the method comprising:
   producing a light beam from a pump to provide gain in a rare-earth doped fiber;
   directing said light beam to a semiconductor saturable absorber mirror used to produce said mode-locked pulse train;
   optically modulating a saturable loss of said semiconductor saturable absorber mirror by said light beam from said pump to stabilize said mode-locked pulse train, said modulation comprising modulating said pump by an electrical signal to modulate said light beam, said electrical signal comprising a continuous component and a high frequency signal component, and a frequency of said high frequency signal is substantially the same as a repetition rate of said mode-locked pulse train; and
   optimizing the level of the continuous component and the high frequency signal component,
   wherein the light beam emitted by said pump is used both for exciting rare-earth atoms and to optically modulate the losses of the saturable absorber.

2. The method according to claim 1, wherein the light beam emitted by the pump and having a wavelength above the energy band gap of the semiconductor absorber is used both for pumping a gain medium and for optically controlling the absorption of the semiconductor absorber.

3. The method according to claim 1, wherein two semiconductor absorbers are used independently, wherein the first semiconductor absorber is used for starting the mode-locking process, and the second semiconductor absorber is used for achieving sufficient modulation index by optical pumping to synchronize the mode-locked pulse train to external RF signal.

4. The method according to claim 1, wherein the loss introduced by said semiconductor absorber is optically controlled and produce active mode-locking synchronized to external RF signal.

5. The method according to claim 1, wherein a sinusoidal clock signal with a frequency corresponding to a high harmonic frequency of the laser cavity part is generated from the mode-locked pulse train, wherein the clock signal is used to modulate the pump source.

6. A system for stabilizing a mode-locked pulse train to an electrical signal, the system comprising:
   a pump for producing a light beam for optically modulating a saturable loss of a semiconductor absorber to produce said mode-locked pulse train,
   a coupler configured to couple the light beam produced by the pump to a rare-earth doped gain fiber and to direct the light beam produced by the pump to the semiconductor absorber, and
   means for modulating said pump by an electrical signal to optically modulate a saturable loss of said semiconductor absorber by said light beam from said pump said electrical signal comprising a DC component and an RF component,
   wherein said system is configured to optimize the level of the continuous signal and the high frequency signal component, wherein a frequency of said high frequency signal is substantially the same as a repetition rate of said mode-locked pulse train, and wherein the light beam emitted by said pump is both for exciting rare-earth atoms and to optically pump the semiconductor absorber.

7. The system according to claim 6, wherein it comprises two semiconductor absorbers, wherein the first semiconductor absorber is arranged to be used for the mode-locking, and the second semiconductor absorber is arranged to be used for achieving sufficient modulation index by optical pumping.

8. The system according to claim 6, wherein it comprises means for optically controlling the loss introduced by said semiconductor absorber to actively mode-locking said pulse train.

9. The system according to claim 6, wherein it comprises means for generating a sinusoidal clock signal with a frequency corresponding to a high harmonic frequency of the laser cavity part from the mode-locked pulse train, wherein the clock signal is used to modulate the pump source.

10. A fiber laser configured to stabilize a mode-locked pulse train to an electrical signal, comprising:
    a semiconductor saturable mirror configured to generate a mode-locked pulse train,
    a pump configured to provide gain in a rare-earth doped fiber and to optically modulate a saturable loss of said semiconductor saturable absorber mirror to produce said mode-locked pulse train,
    a coupler configured to direct a light beam produced by said pump into the doped fiber and towards said semiconductor absorber,
    means for modulating said pump by an electrical signal to optically modulate a saturable loss of said semiconductor absorber by said light beam from said pump, said electrical signal comprising a continuous component and a high frequency component, and
    wherein said system is configured to optimize the level of the continuous signal and the high frequency signal component, wherein a frequency of said high frequency signal is substantially the same as a repetition rate of said mode-locked pulse train, and wherein the light beam emitted by said pump is both for exciting rare-earth atoms and to optically pump the semiconductor absorber.

* * * * *